US008489759B2

(12) United States Patent
Parham et al.

(10) Patent No.: US 8,489,759 B2
(45) Date of Patent: Jul. 16, 2013

(54) SERVICE DISCOVERY AND PUBLICATION

(75) Inventors: Jeffrey B. Parham, Redmond, WA (US); Charles R. Reeves, Snohomish, WA (US); Lawrence A. Buerk, Issaquah, WA (US); Angela Mills, Redmond, WA (US); Richard L. Hasha, Seattle, WA (US); Gopal Krishna R. Kakivaya, Sammamish, WA (US); Andrew D. Milligan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/774,879

(22) Filed: May 6, 2010

(65) Prior Publication Data
US 2010/0217782 A1    Aug. 26, 2010

Related U.S. Application Data

(63) Continuation of application No. 10/693,653, filed on Oct. 24, 2003, now Pat. No. 7,716,357.

(51) Int. Cl.
*G06F 15/16* (2006.01)
*G06F 9/46* (2006.01)
*G06F 17/30* (2006.01)

(52) U.S. Cl.
USPC ............................ 709/231; 707/803; 719/328

(58) Field of Classification Search
USPC ................. 709/231, 225, 224, 208, 203, 227, 709/201, 246; 719/315, 328; 707/803
See application file for complete search history.

(56) References Cited

U.S. PATENT DOCUMENTS

| | | | |
|---|---|---|---|
| 5,893,107 | A | 4/1999 | Chan et al. |
| 6,067,568 | A | 5/2000 | Li et al. |
| 6,366,934 | B1 | 4/2002 | Cheng et al. |
| 6,463,078 | B1 | 10/2002 | Engstrom et al. |
| 6,584,459 | B1 | 6/2003 | Chang et al. |
| 6,594,653 | B2 | 7/2003 | Colby et al. |
| 6,631,371 | B1 | 10/2003 | Lei et al. |
| 6,959,262 | B2 | 10/2005 | Curry, III |

(Continued)

FOREIGN PATENT DOCUMENTS

| | | |
|---|---|---|
| JP | 2001282488 A | 10/2001 |
| JP | 2003091553 | 3/2003 |

(Continued)

OTHER PUBLICATIONS

The Canadian Office Action mailed Aug. 19, 2011 for Canadian patent application No. 2501718, a counterpart foreign application of U.S. Appl. No. 10/693,653, 3 pages.

(Continued)

*Primary Examiner* — Jungwon Chang
(74) *Attorney, Agent, or Firm* — Lee & Hayes, PLLC

(57) ABSTRACT

A system and methods for service discovery and publication are disclosed. Application programs write requests for service discovery, publication, and subscription to a service discovery application programming interface. The service discovery application programming interface invokes one or more lower-level protocols to satisfy the discovery, publication and/or subscription request. Service information retrieved from lower-layer protocols is formatted into a consistent data model and returned to the client application. In addition, service information may be stored in a persistent data store managed by a discovery persistence service communicatively connected to the service discovery API.

9 Claims, 19 Drawing Sheets

U.S. PATENT DOCUMENTS

| | | | |
|---|---|---|---|
| 7,085,814 B1* | 8/2006 | Gandhi et al. .............. 709/208 | |
| 7,401,338 B1 | 7/2008 | Bowen et al. | |
| 7,716,357 B2* | 5/2010 | Milligan et al. ............. 709/231 | |
| 2002/0099814 A1* | 7/2002 | Mastrianni ................... 709/224 | |
| 2002/0112058 A1* | 8/2002 | Weisman et al. ............ 709/227 | |
| 2003/0135628 A1 | 7/2003 | Fletcher et al. | |
| 2003/0140119 A1 | 7/2003 | Acharya et al. | |
| 2004/0010590 A1 | 1/2004 | Manzano | |
| 2004/0111525 A1* | 6/2004 | Berkland et al. ............. 709/231 | |
| 2004/0120344 A1 | 6/2004 | Sato et al. | |
| 2004/0133896 A1* | 7/2004 | Lym et al. .................... 719/315 | |
| 2004/0139151 A1* | 7/2004 | Flurry et al. ................. 709/203 | |
| 2004/0162871 A1* | 8/2004 | Pabla et al. .................. 709/201 | |
| 2004/0210630 A1 | 10/2004 | Simonnet et al. | |
| 2004/0213409 A1 | 10/2004 | Murto et al. | |
| 2004/0261086 A1 | 12/2004 | Jensen et al. | |
| 2005/0080768 A1 | 4/2005 | Zhang et al. | |
| 2005/0091374 A1* | 4/2005 | Ganesan et al. ............. 709/225 | |

FOREIGN PATENT DOCUMENTS

| | | | |
|---|---|---|---|
| JP | 2003223449 A1 | 8/2003 | |
| RU | 2143183 | 12/1999 | |
| WO | WO0190883 | 11/2001 | |
| WO | WO03083676 A1 | 10/2003 | |

OTHER PUBLICATIONS

Translated Japanese Office Action mailed Jul. 29, 2011 for Japanese patent application No. 2006-536562, a counterpart foreign application of US patent No. 7,716,357, 4 pages.

Maruyama, et al., "Realizing Dynamic Electronic Commerce by Using Web Services, -SOAP/WSDL/UDDI-," IPSJ Magazine, vol. 42, No. 7, pp. 643-647, Information Processing Society of Japan, Japan, Jul. 15, 2001.

Sato, "FTP Site Search Tool, archiesrv-1.2, archie.cgi, xarchie-2.0. 10, c-archie-1.4.1, archieplex," Solaris Review, No. 2, pp. 130-137, IDG Japan, Inc., Japan, Oct. 1, 2000.

The Korean Office Action mailed Nov. 2, 2011 for Korean patent application No. 10-2011-7016088, a counterpart foreign application of US patent No. 7,716,357, 2 pages.

Translated Japanese Office Action mailed Feb. 4, 2011 for Japanese Patent Application No. 2006-536562, a counterpart foreign application of US Patent No. 7,716,357, 5 pages.

The Korean Office Action mailed Mar. 11, 2011 for Korean Patent Application No. 10-2005-7008290, a counterpart foreign application of US Patent No. 7,716,357, 5 pages.

Bott E, Siechert K., Effective work: Windows XP, St-Ptsb. Piter, 2004, p. 1021. (the Translation of the book: Ed Bott, Carl Siechert, Microsoft Windows XP Inside Out, Microsoft Press, 2001).

Guttman, "Service Location Protocol: Automatic Discovery of IP Network Services", Jul./ Aug. 1999;pp. 71-80; http://computer.org/internet.

The Supplementary Search Report mailed Sep. 14, 2012, for European patent application No. 04778869.0,6 pages.

Hoschek, "A Unified Peer-to-Peer Database Framework for XQueries Over Dynamic Distributed Content and Its Application for Scalable Service Discovery", PhD Thesis, Mar. 1, 2002, Technical University of Vienna, Austria, retrieved from the internet at https://acs.lbl.gov/hosceck/publications/phd2002-hoschek.pdf, retrieved on Sep. 4, 2012.

The Indian Office Action mailed Sep. 4, 2012 for Indian patent application No. 1817/DELNP/2005, a counterpart foreign application of US patent No. 7,716,357, 2 pages.

Jasune, "A Service Browser for the Service Location Protocol Version 2 (SLPv2)", Proceedings of the Eunice Open European Summary School and the IFIP Workshop on IP and ATM Traffice Management (WATM), Sep. 3, 2001, Paris, France, retrieved from the internet at http://bettstetter.com/publications/jasund-2001-eunice-slpbrowser.pdf, retrieved on Sep. 4, 2012.

Kempf, et al., "An API for Service Location", Jun. 1, 1999.

Sedov, et al., "Time and Energy Efficient Service Discovery in Bluetooth", VTC 2003, Spring, Proceedings of the 57th IEEE Semiannual Vehicular Technology Conference, Jeju, Korea, Apr. 22-25, 2003, IEEE, New York, NY, USA, vol. 1, pp. 418-422.

Hoschek, "A Unified Peer-to-Peer Database Framework for XQueries Over Dynamic Distributed Content and Its Application for Scalable Service Discovery", PhD Thesis, Mar. 1, 2002, Technical University of Vienna, Austria, retrieved from the internet at https://acs.lbl.gov/hosceck/publications/phd2002-hoschek.pdf, retrieved on Sep. 4, 2012, 166 pages.

Jasune, "A Service Browser for the Service Location Protocol Version 2 (SLPv2)", Proceedings of the Eunice Open European Summary School and the IFIP Workshop on IP and ATM Traffice Management (WATM), Sep. 3, 2001, Paris, France, retrieved from the internet at http://bettstetter.com/publications/jasund-2001-eunice-slpbrowser.pdf, retrieved on Sep. 4, 2012, 6 pages.

Translated Japanese Office Action mailed Oct. 2, 2012 for Japanese patent application No. 2010-288262, a counterpart foreign application of US patent No. 7,716,357, 8 pages.

Kempf, et al., "An API for Service Location", Jun. 1, 1999, 92 pages.

Korean Office Action mailed Jan. 31, 2012 (and redacted English translation) for Korean patent application No. 10-2005-7008290, a counterpart foreign application of US patent No. 7,716,357, 5 pages.

Translated Japanese Office Action mailed May 22, 2012 for Japanese patent application No. 2010-288262, a counterpart foreign application of US patent No. 7,716,357, 20 pages.

Eugster, et al., "The Many Faces of Publish/Subscribe", Computing Surveys, vol. 35, Issue 2, pp. 114 to 131, ACM, U.S., Jun. 2003.

Nagao, "Architecture Networking Household Electrical Appliance, the Whole Picture of Universal Plug and Play, the Third Round, UPnP Programming in Windows XP", Interface, vol. 29, No. 9, pp. 176 to 187, CQ Publishing Co., Ltd., Japan, Sep. 1, 2003.

* cited by examiner

```
static void SimpleFilterAD()
{
    // Declare a ServiceFinder
    System.Discovery.ServiceFinder servFind = new ServiceFinder();

// Specify to search using Active Directory in the global catalog
    servFind.Scopes.Add (new ConcreteScope (ConcreteScope.ADProtocol, "GC:",
    null));

// Filter for only printers
    SimpleFilter filter = new SimpleFilter ();
    filter.ServiceType = CommonServiceTypes.Printer;
    servFind.Filter = filter;

// Declare the properties to match on
    filter.Properties.Add ("printcolor", "TRUE");
    filter.Properties.Add ("pagesperminute", "50");

// Find all entities matching the filter within the scope
    ServiceEntryCollection seColl = servFind.FindAll ();

// Report results
    Console.WriteLine ("Results Found: " + seColl.Count);

foreach (ServiceEntry se in seColl)
    {
        Console.WriteLine ("Name: " + se.Name);
        Console.WriteLine ("Description: " + se.Description);
        If ((se.Endpoints!=null) && (se.Endpoints.Count>0))
        {
            Console.WriteLine ("Address: " + se.Endpoints[0].Address);
        }
        Console.WriteLine ("Key: " + se.Key);
        Console.WriteLine ();
    }
}
```

Fig. 8

```
static void RichFilterUDDI ()
{
    // Declare a ServiceFinder
    ServiceFinder servFind = new ServiceFinder ();

// Specify to search using the UDDI protocol in the
    // test version of the Microsoft UDDI Business Registry
    servFind.Scopes.Add (new ConcreteScope (ConcreteScope.UddiProtocol,
            "http://test.uddi.microsoft.com/inquire", null));

// Filter for only Web services named Fabrikam
    // that implement a specific interface i.e. the
    // tModel "uddi-org:inquiry_v2"
    RichFilter filter = new RichFilter
        ("WebService[ name = 'Fabrikam' and ServiceInterface = 'uuid:ac104dcc-d623-452f-88a7-f8acd94d9b2b'
]");

servFind.Filter = filter;

// Find all entities matching the filter within the scope
    ServiceEntryCollection seColl = servFind.FindAll ();

// Report results
    Console.WriteLine ("Results Found: " + seColl.Count);
    foreach (ServiceEntry se in seColl)
    {
        Console.WriteLine ("Name: " + se.Name);
        if((se.Endpoints!=null) && (se.Endpoints.Count>0))
        {
            Console.WriteLine ("Address: " + se.Endpoints[0].Address);
        }
        Console.WriteLine ("Key: " + se.Key);
        Console.WriteLine ();
    }
}
```

```
static void SimpleFilterUDDI ()
{
    // Declare a ServiceFinder.
    System.Discovery.ServiceFinder servFind = new ServiceFinder ();

// Specify to search using the UDDI protocol in the
    // Microsoft UDDI Business Registry node.
    servFind.Scopes.Add (new ConcreteScope
(ConcreteScope.UddiProtocol,
"http://uddi.microsoft.com/inquire", null));

// Filter for only services that implement a specific interface,
    // i.e. the tModel "uddi-org:inquiry_v2".
    SimpleFilter filter = new SimpleFilter ();
    filter.ServiceInterfaces.Add(
"uuid:ac104dcc-d623-452f-88a7-f8acd94d9b2b");

servFind.Filter = filter;

// Find all entities matching the filter within the scope.
    ServiceEntryCollection seColl = servFind.FindAll ();

// Report results.
    Console.WriteLine ("Results Found: " + seColl.Count);

foreach (ServiceEntry se in seColl)
    {
        Console.WriteLine ("Name: " + se.Name);
        Console.WriteLine ("Description: " + se.Description);
        if((se.Endpoints!=null) && (se.Endpoints.Count>0))
        {
            Console.WriteLine ("Address: " + se.Endpoints[0].Address);
        }
        Console.WriteLine ("Key: " + se.Key);
    }
}
```

```
Sub SimpleFilterUDDI()
    ' Declare a ServiceFinder.
    Dim servFind = New ServiceFinder ' Specify to search using the UDDI protocol in the
    ' Microsoft UDDI Business Registry node.
    servFind.Scopes.Add(New ConcreteScope(ConcreteScope.UddiProtocol, _
"http://uddi.microsoft.com/inquire", Nothing))

' Filter for only services that implement a specific interface,
    ' i.e. the tModel "uddi-org:inquiry_v2".
    Dim filter As New SimpleFilter
    filter.ServiceInterfaces.Add( _
"uuid:ac104dcc-d623-452f-88a7-f8acd94d9b2b")

servFind.Filter = filter

' Find all entities matching the filter within the scope.
    Dim seColl As ServiceEntryCollection = servFind.FindAll()

' Report results.
    Console.WriteLine("Results Found: " & seColl.Count)

Dim se As ServiceEntry
    For Each se In seColl
        Console.WriteLine("Name: " & se.Name)
        Console.WriteLine("Description: " & se.Description)
        If Not (se.Endpoints Is Nothing) AndAlso se.Endpoints.Count > 0 Then
            Console.WriteLine("Address: " & se.Endpoints(0).Address)
        End If
        Console.WriteLine("Key: " & se.Key)
    Next se End Sub 'SimpleFilterUDDI
```

Fig. 11

```
static void RichFilterAD ()
{
    // Declare a ServiceFinder.
    ServiceFinder servFind = new ServiceFinder ();

// Specify to search using Active Directory in the global catalog.
    servFind.Scopes.Add (new ConcreteScope (
    ConcreteScope.ADProtocol, "GC:", null));

// Filter for printers where the name begins with 'Office Printer'.
    RichFilter filter = new RichFilter (
    "Printer[ name like 'Office Printer' ]");

servFind.Filter = filter;

// Find all entities matching the filter within the scope.
    ServiceEntryCollection seColl = servFind.FindAll ();

// Report results
    Console.WriteLine ("Results Found: " + seColl.Count);
    foreach (ServiceEntry se in seColl)
    {
        Console.WriteLine ("Name: " + se.Name);
        if((se.Endpoints!=null) && (se.Endpoints.Count>0))
        {
            Console.WriteLine ("Address: " +
    se.Endpoints[0].Address);
        }
        Console.WriteLine ("Key: " + se.Key);
    }
}
```

Fig. 12

```
Sub RichFilterAD()
    ' Declare a ServiceFinder.
    Dim servFind As New ServiceFinder ' Specify to search using Active Directory in the global catalog.
    servFind.Scopes.Add(New ConcreteScope( _
            ConcreteScope.ADProtocol, "GC:", Nothing))

' Filter for printers where the name begins with 'Office Printer'.
    Dim filter As New RichFilter("Printer[ name like 'Office Printer' ]")

servFind.Filter = filter

' Find all entities matching the filter within the scope.
    Dim seColl As ServiceEntryCollection = servFind.FindAll()

' Report results
    Console.WriteLine("Results Found: " & seColl.Count)
    Dim se As ServiceEntry
    For Each se In seColl
        Console.WriteLine("Name: " & se.Name)
        If Not (se.Endpoints Is Nothing) AndAlso se.Endpoints.Count > 0 Then
            Console.WriteLine("Address: " & se.Endpoints(0).Address)
        End If
        Console.WriteLine("Key: " & se.Key)
    Next se End Sub 'RichFilterAD
```

```
const string sampleServiceType = "75FF48AB-E771-4d44-9E8C-E09141112417";
static string sampleServiceKey = Guid.NewGuid().ToString();

static void Save()
{
    // Instantiate a new ServiceEntry object.
    ServiceEntry service = new ServiceEntry();

// Add the scope to publish this service entry into.
    service.Scopes.Add( new ConcreteScope( ConcreteScope.SsdpProtocol )
    );

// Assign a unique key, some protocols may generate one.
    service.Key = sampleServiceKey;

// The type of the service is specified by setting
    // the ServiceType property.
    service.ServiceType = new ServiceInterface( sampleServiceType );

// Add an endpoint reference to the address for accessing the service.
    Endpoint ep = new Endpoint( Environment.MachineName, null );
    service.Endpoints.Add( ep );

// Publish the service information synchronously
    // into the specified scope.
    service.Save();
}
```

Fig. 15

```
Const sampleServiceType As String = "75FF48AB-E771-4d44-9E8C-
E09141112417"
Shared sampleServiceKey As String = Guid.NewGuid().ToString()

Shared Sub Save()
    'Instantiate a new ServiceEntry object.
    Dim service As New ServiceEntry 'Add the scope to publish this service entry into.
    service.Scopes.Add(New ConcreteScope(ConcreteScope.SsdpProtocol))

'Assign a unique key, some protocols may generate one.
    service.Key = sampleServiceKey 'The type of the service is specified by setting
    'the ServiceType property.
    service.ServiceType = New ServiceInterface(sampleServiceType)

'Add an endpoint reference to the address for accessing the service.
    Dim ep As New Endpoint(Environment.MachineName, Nothing)
    service.Endpoints.Add(ep)

'Publish the service information synchronously
    'into the specified scope.
    service.Save()

End Sub 'Save
```

```
static void Delete()
{
    // Instantiate a new ServiceEntry object.
    ServiceEntry service = new ServiceEntry();

// Specify the unique key of the service to delete.
    service.Key = sampleServiceKey;

// Add the scope to delete this service from.
    service.Scopes.Add( new ConcreteScope( ConcreteScope.SsdpProtocol )
    );

// Delete the service information synchronously
    // from the specified scope.
    service.Delete();
}
```

Fig. 16

```
Sub Delete()
  ' Instantiate a new ServiceEntry object.
  Dim service As New ServiceEntry ' Specify the unique key of the service to delete.
  service.Key = sampleServiceKey ' Add the scope to delete this service from
  service.Scopes.Add(New
ConcreteScope(ConcreteScope.SsdpProtocol))

' Delete the service information synchronously
  ' from the specified scope.
  service.Delete()

End Sub 'Delete
```

Fig. 17

```
public sealed class SubscriptionSample
{
    // This delegate will be called each time a notification of an
    // update on the SampleService occurs.
        private static ServiceFinder.ServiceUpdateEventHandler handler =
                new ServiceFinder.ServiceUpdateEventHandler( Handler );

private static ServiceFinder finder = new ServiceFinder();

public static void Subscribe()
    {
        // Initialize the finder to look for 'castle' home networks.
            finder.Scopes.Add( new ConcreteScope(
ConcreteScope.SsdpProtocol ) );
            finder.Filter = new SimpleFilter(
CommonServiceTypes.HomeNetwork );

// Add our handler to the delegate for service updates.
            finder.ServiceUpdate += handler;
    } public static void Unsubscribe()
    {
        // Remove our handler from the delegate for service updates.
            finder.ServiceUpdate -= handler;
    }

// This is the callback function that was registered with the delegate.
    private static void Handler( object sender, ServiceUpdateEventArgs e
    {
        // Handle the service update here.
            Console.WriteLine( "UpdateType{0}\t(key={1})",
e.UpdateType, e.Services[ 0 ].Key );
    }
}
```

```
Public NotInheritable Class SubscriptionSample

' This delegate will be called each time a notification of an
    ' update on the SampleService occurs.

Private Shared finder As New ServiceFinder

Public Shared Sub Subscribe()
        ' Initialize the finder to look for castle home networks.
        finder.Scopes.Add(New
ConcreteScope(ConcreteScope.SsdpProtocol))
        finder.Filter = New SimpleFilter(CommonServiceTypes.HomeNetwork)

' Add our handler to the delegate for service updates.
        AddHandler finder.ServiceUpdate, AddressOf Handler
    End Sub 'Subscribe Public Shared Sub Unsubscribe()
        ' Remove our handler from the delegate for service updates.
        RemoveHandler finder.ServiceUpdate, AddressOf Handler
    End Sub 'Unsubscribe ' This is the callback function that was registered with the delegate.
    Private Shared Sub Handler(ByVal sender As Object, _
        ByVal e As ServiceUpdateEventArgs)

' Handle the service update here.
        Console.WriteLine("UpdateType{0}" & vbTab & "(key={1})", _
            e.UpdateType, e.Services(0).Key)
    End Sub 'Handler End Class 'SubscriptionSample
```

SERVICE DISCOVERY AND PUBLICATION

RELATED APPLICATIONS

This application is a Continuation of, and claims priority to, co-pending application Ser. No. 10/693,653, filed Oct. 24, 2003, entitled "Service Discovery and Publication," which is incorporated herein by reference.

TECHNICAL FIELD

The described subject matter relates to digital computing, and more particularly to service discovery in computing devices and computing networks.

BACKGROUND

Application programs that execute on computing devices and computer networks may require the use of services provided by other physical or logical devices connected to the computing device or network. Presently, application programs use a wide range of application programming interfaces (APIs), protocols, and object models to discover, enumerate, and describe services and devices on a local computing device or across a plurality of devices in a computer network. The mechanisms available to discover, enumerate, and describe services and devices differ significantly, even when the services and devices involved are conceptually similar.

For example, consider a situation in which an application seeks to enumerate available printers. When executing within an administered, corporate environment, the application may need to use Lightweight Directory Access Protocol (LDAP) to communicate with a Microsoft Active Directory® directory service store to discover registered corporate printers, NetBT to discover print queue servers, and Bluetooth to discover personal area network printers. In addition, the application might have to invoke device management APIs to discover direct attached printers, and UPnP™ APIs to discover UPnP printers. Each of these mechanisms requires understanding of a particular API, protocol, and query semantic.

The number of APIs and protocols required to for an application to discover, enumerate, and describe services complicates the task of software development.

SUMMARY

Implementations described and claimed herein address these and other problems by providing a uniform interface that simplifies discovery and publication tasks. The uniform interface permits underlying protocols to be leveraged and eliminates the need for application developers to understand low-level protocols. The uniform interface provides a consistent, high-level abstraction of services and associated operations that targets the discovery and publication of service details over a wide range of lower-level APIs, protocols, stores, and network environments.

In one exemplary implementation, a method for discovering services available in a computing environment is provided. The method comprises: in an application program, defining a discovery scope; defining a discovery filter; and initiating a search request to a first application programming interface; and in the first application programming interface: parsing the search request; retrieving service information corresponding to the requested discovery scope and discovery filter; and returning the service information to the application program.

In another exemplary implementation, a method for publishing services available in a computing environment is provided. The method comprises, in an application program: defining a service entry object; defining a publication scope; assigning a unique key to the service; assigning a service type; defining properties for the service; and defining endpoints for the service; and initiating a publication request to a first application programming interface; and in the first application programming interface: parsing the search request; and executing at least one low-level API call to publish the service.

In another exemplary implementation, a method for deleting a published service in a computing environment is provided. The method comprises, in an application program: defining a service entry object; specifying a key corresponding to the published service; defining a deletion scope; and initiating a deletion request to a first application programming interface; and in the first application programming interface: parsing the search request; and executing at least one low-level API call to delete the service.

In another exemplary implementation, a method of subscribing to service events in a computing environment is provided. The method comprises, in an application program: defining a scope; defining a filter; defining a callback function; and initiating a subscription request to a first application programming interface; and in the first application programming interface: parsing the search request; and executing at least one low-level API call to subscribe to service events; and returning information from service events to the application program.

In another exemplary implementation, a system for managing information about services available in a computing environment is provided. The system comprises a first application programming interface configured to accept service queries from an application, wherein the first application programming interface receives service queries in a first service query protocol, processes the service queries, and launches at least one corresponding service query to a second protocol; a discovery persistence service communicatively connected to the first application programming interface, wherein the discovery persistence service receives service information from the first application programming interface and stores the service information in a data store.

BRIEF DESCRIPTION OF THE DRAWINGS

FIG. 8 is pseudo-code illustrating how to use the C# programming language to locate color printers that print 50 pages per minute using a SimpleFilter object on the Active Directory protocol;

FIG. 9 is pseudo-code illustrating how to use the C# programming language to locate Web services;

FIG. 10 is pseudo-code illustrating the use of the C# programming language to find services supporting a specific tModel interface using a SimpleFilter object and the UDDI protocol;

FIG. 11 is pseudo-code illustrating the use of Visual Basic. NET to find services supporting a specific tModel interface using a SimpleFilter object and the UDDI protocol;

FIG. 12 is pseudo-code illustrating the use of the C# programming language to locate a printer with a name like Office Printer using the RichFilter with Active Directory;

FIG. 13 is pseudo-code illustrating the use of Visual Basic. NET to locate a printer with a name like Office Printer using the RichFilter with Active Directory;

FIG. 14 is pseudo-code illustrating the use of the C# programming language to publish a service of a specific type, identified by a specific unique identifier, using the SSDP protocol;

FIG. 15 is pseudo-code illustrating the use of Visual Basic. NET to publish a service of a specific type, identified by a specific unique identifier, using the SSDP protocol;

FIG. 16 is pseudo-code illustrating the use of the C# programming language to delete a service from the SSDP protocol;

FIG. 17 is pseudo-code illustrating the use of Visual Basic. NET to delete a service from the SSDP protocol;

FIG. 18 is pseudo-code illustrating the use of the C# programming language to use a SimpleFilter to register for events of a specific type that use the SSDP protocol. The registered callback function will be invoked for every event that matches the filter and the corresponding ServiceEntry object will be provided to that handler; and FIG. 19 is pseudo-code illustrating the use of Visual Basic. NET to use a SimpleFilter to register for events of a specific type that use the SSDP protocol.

DETAILED DESCRIPTION

Described herein are exemplary methods and software architecture for service discovery and publication. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Exemplary Operating Environment

Figure 1:
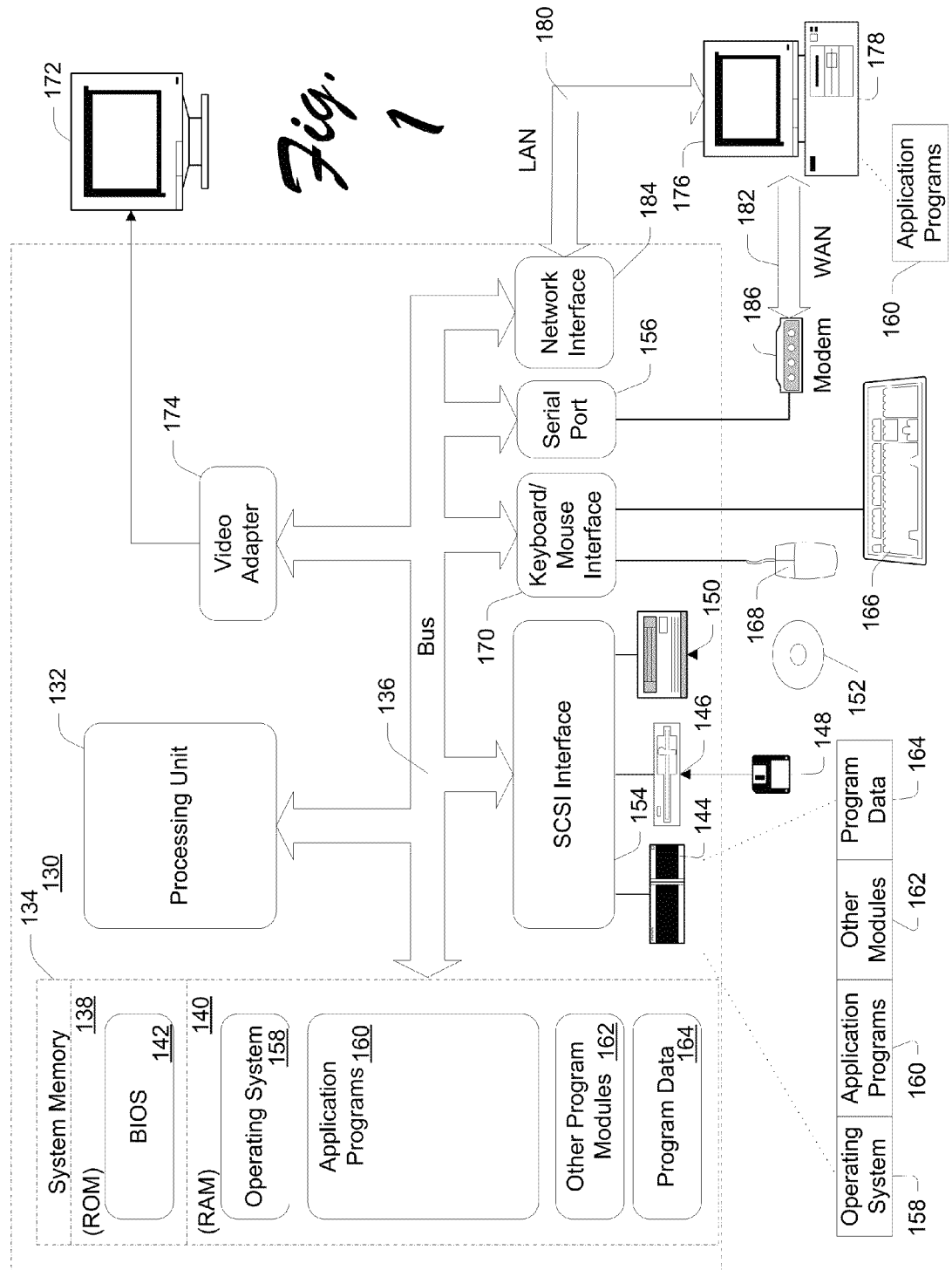
FIG. 1 is a schematic illustration of an exemplary computing device.

FIG. 1 is a schematic illustration of an exemplary computing device 130 that can be utilized to implement one or more computing devices in accordance with the described embodiment. Computing device 130 can be utilized to implement various implementations in accordance with described embodiments.

Computing device 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computing device 130, such as during start-up, is stored in ROM 138.

Computing device 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computing device 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computing device 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computing device 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computing device 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computing device 130 is connected to the local network 180 through a network interface or adapter 184. When used in a WAN networking environment, computing device 130 typically includes a modem 186 or other means for establishing communications over the wide area network 182, such as the Internet. The modem 186, which may be internal or external, is connected to the bus 136 via a serial port interface 156. In a networked environment, program modules depicted relative to the computing device 130, or portions thereof, may be stored in the remote memory storage device. It will be appreciated that the network connections shown are exemplary and other means of establishing a communications link between the computers may be used.

Generally, the data processors of computing device 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

Exemplary Software Architecture Overview

Figure 2:
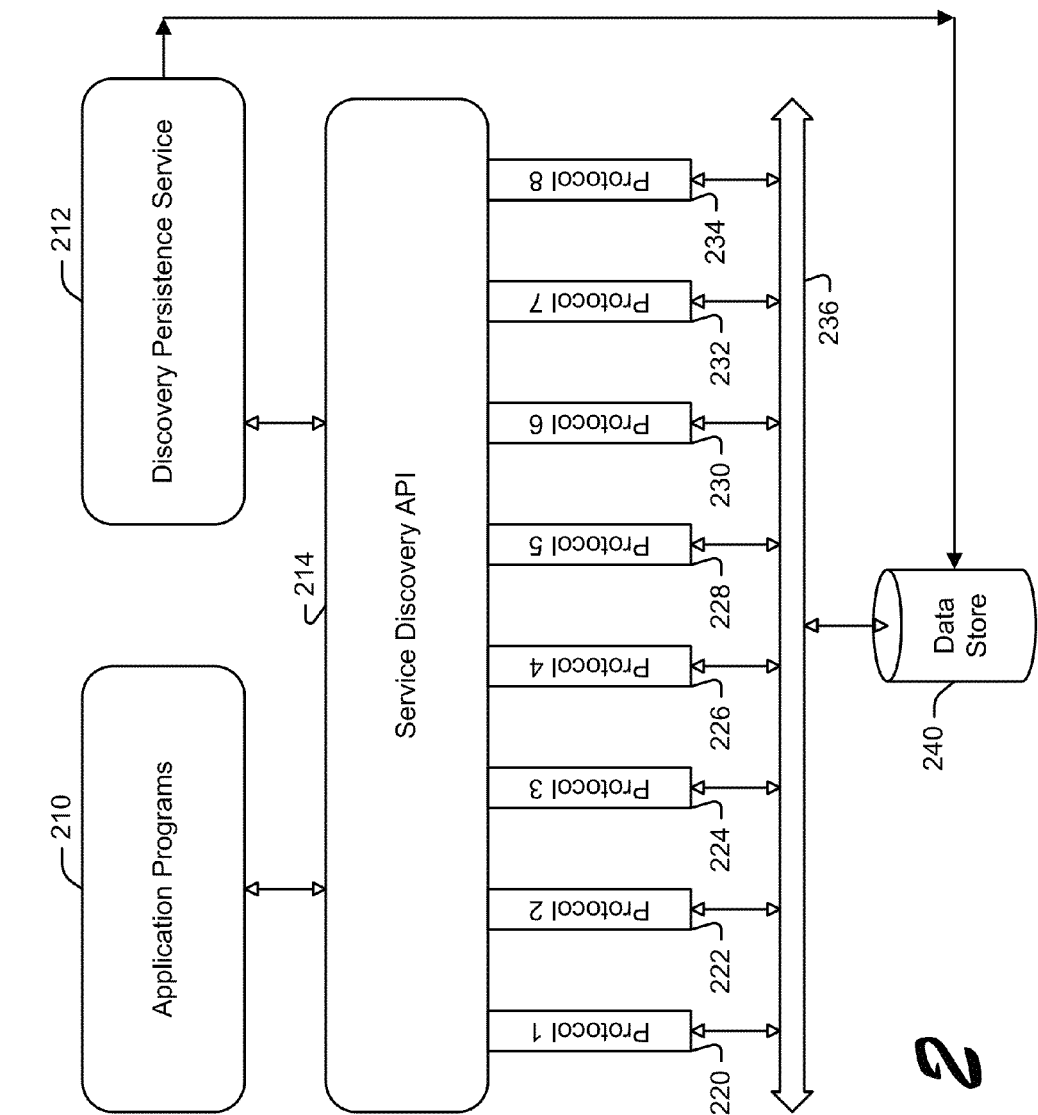
FIG. 2 is a block diagram illustrating an exemplary software architecture.

FIG. 2 is a block diagram of an exemplary software architecture 200 for service discovery that may reside in system memory 134 of FIG. 1. In this implementation, system memory 134 may comprise a plurality of application programs 210. In a networked environment the application programs may function as client programs, while in a PC environment the applications may execute as stand-alone programs. The particular nature of the application programs is not critical.

Application programs 210 invoke service discovery API 214 to discover services available in the computing environment. Service discovery API 214 provides a high-level grammar for expressing discovery queries. The grammar may be implemented in OPath, a natural query language used for expressing discovery queries. This high-level grammar provides software developers a more conceptual mechanism to express the service(s) the developer is looking for, rather than requiring a more granular and protocol-specific expression that may be required by the underlying protocols 220-234. The developer can construct a query using the high-level grammar, which may then be forwarded to either a specific set of protocols, referred to as a number of "concrete scopes", or use an "abstract scope" which is a predefined or configured set of concrete scopes. In addition to supporting service discovery, the system supports service publication/deleting, and monitoring for events.

Service discovery API 214, in turn, invokes one or more underlying protocols, represented in the diagram by Protocol 1 220 through Protocol 8 234. The particular number of underlying protocols is not important. Certain of the protocols 220-234 may be directory-backed protocols such as, e.g., LDAP, Universal Description, Discovery and Integration (UDDI), and Domain Name System (DNS) Server. Other protocols may be ad-hoc protocols such as, e.g., Bluetooth, UPnP, and NetBT. One or more of the underlying protocols 220-234 uses a communication connection 236 to communicate with other components or services available in the computing environment.

In response to the discovery request, the service discovery API returns a collection of ServiceEntry objects that represent matching services discovered either on the local machine or on the network. A ServiceEntry object is a generalized data structure that can represent much of the relevant detail returned by the underlying protocols that system supports. Each ServiceEntry object corresponds to a single instance of a service. In one implementation, the ServiceEntry object provides descriptive and identifying properties including: (1) a service name; (2) a service description; (3) endpoints, which typically contain a network address(es) for the service; (4) a key, that identifies the service instance; (5) properties, e.g., an extensible list of name-value pairs for service or device characteristics; and (6) a provider, e.g., an identifier that identifies the entity that provides the service.

A discovery persistence service 212 communicates with service discover API 214. Among other things, discovery persistence service 212 registers for announcement events over ad-hoc protocols. The discovery persistence service is notified when an announcement event is detected, and the discovery persistence service copies information about the service announcement into a memory location in data store 240. Storing service details in a memory location enables discovery of services that may be currently unavailable. For example, even if a printer is currently switched off details about the printer may be registered in the memory location and can be discovered. In addition, service queries are not restricted to the protocol that communicates with the service. Moreover, the performance of querying the memory location may be much better than issuing a broad network discovery query.

Exemplary Operations

Figure 3:
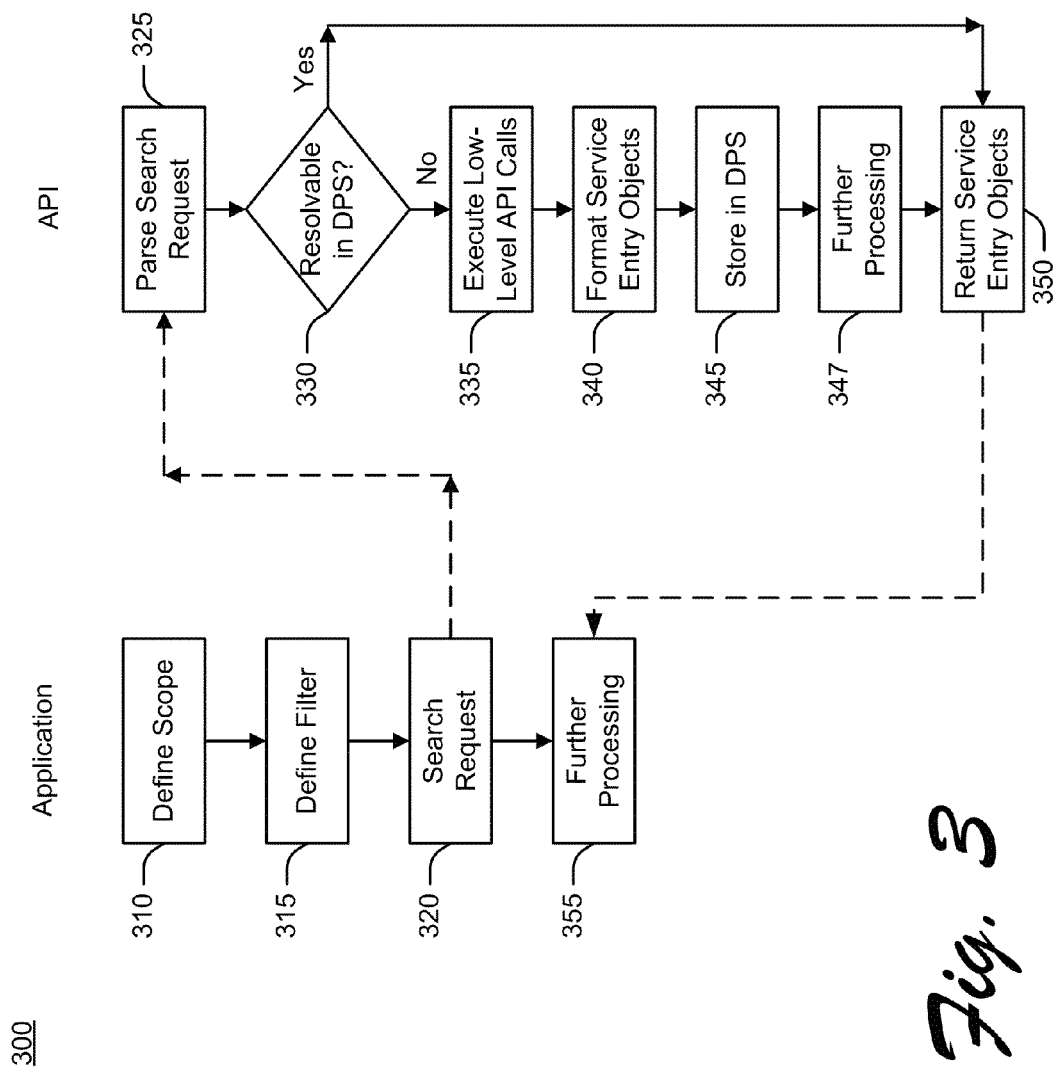
FIG. 3 is a flowchart illustrating operations for service discovery.

In an exemplary implementation, the service discovery API 214 provides methods for service discovery, service publication, and subscribing to service event notifications. FIG. 3 is a flowchart illustrating operations 300 for service discovery. At operation 310 an application defines a scope, at operation 315 the application defines a filter, and at operation 320 the application issues a search request. The service discovery API 214 receives the search request and, at operation 325, the service discovery API 214 parses the search request. At optional operation 330, the service discovery API 214 determines whether the search request is resolvable using information stored in the discovery persistence service 212. In one implementation, information managed by the discovery persistence service 212 includes a time-of-life indicator that specifies the lifespan of the information in the discovery persistence service 212. Depending upon control and configuration, the service discovery API 214 may query the discovery persistence service 212 to determine whether the discovery request can be satisfied using information the discovery persistence service 212 manages on the data store 240. If the discovery request is resolvable using the discovery persistence service 212, then control passes to operation 350, and the service entry objects retrieved from the discovery persistence service 212 are returned to the application.

By contrast, if the discovery request is not resolved or resolvable using information managed by the discovery persistence service 212, then control passes to operation 335, and the service discovery API 214 executes the low-level API call(s) required to fulfill the discovery request. At operation 340 the service information returned from the low-level API calls is formatted into service entry objects, and at optional operation 345 the service entry objects are forwarded to the discovery persistence service, which may store the service entry objects on data store 240. At optional operation 347 further processing and filtering of the service entry results such as duplicate detection and removal may be performed. At operation 350 the service entry objects are returned to the application for further processing, at operation 355. The particular details of the further processing performed by the application are not important.

Figure 4:
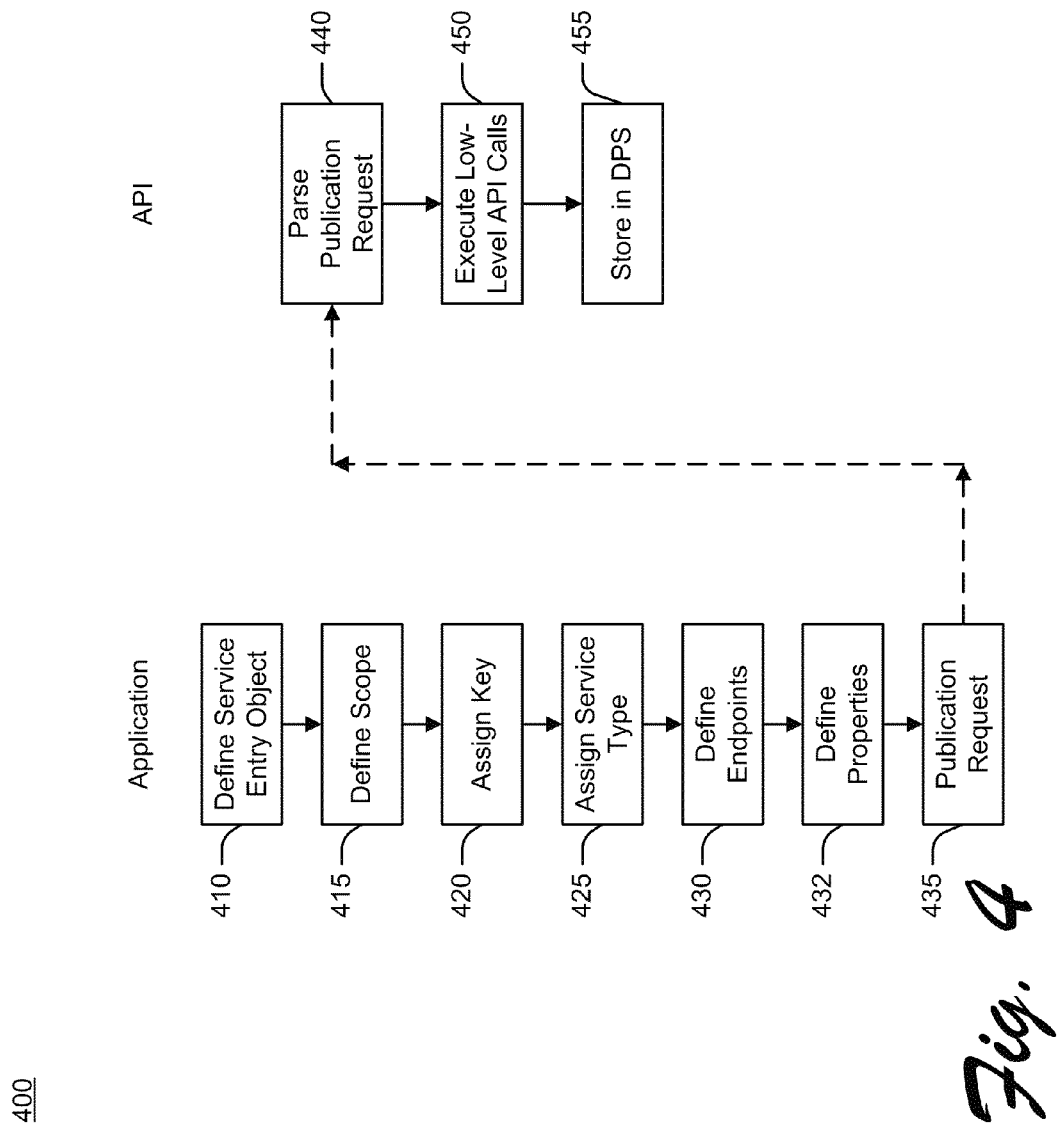
FIG. 4 is a flowchart illustrating operations for service publication.

FIG. 4 is a flowchart illustrating operations for service publication. At operation 410 an application defines a service entry object for the service publication. At operation 415 the application defines the scope for the service publication. At operation 420 the application assigns a unique key to the service publication, and at operation 425 the application assigns a service type to the service publication. At operation 430 the application defines endpoints for the service publication, at operation 432 the application defines properties for the service publication and at operation 435 the application generates a publication request. The steps performed may vary according to the detail of information that is to be published and the low-level API that will be used.

The service discovery API 214 receives the publication request and, at operation 440, parses the publication request. At operation 450 the service discovery API 214 executes the low-level API calls to execute the service publication request. At optional operation 455 the service publication is stored in the discovery persistence service 212.

Figure 5:
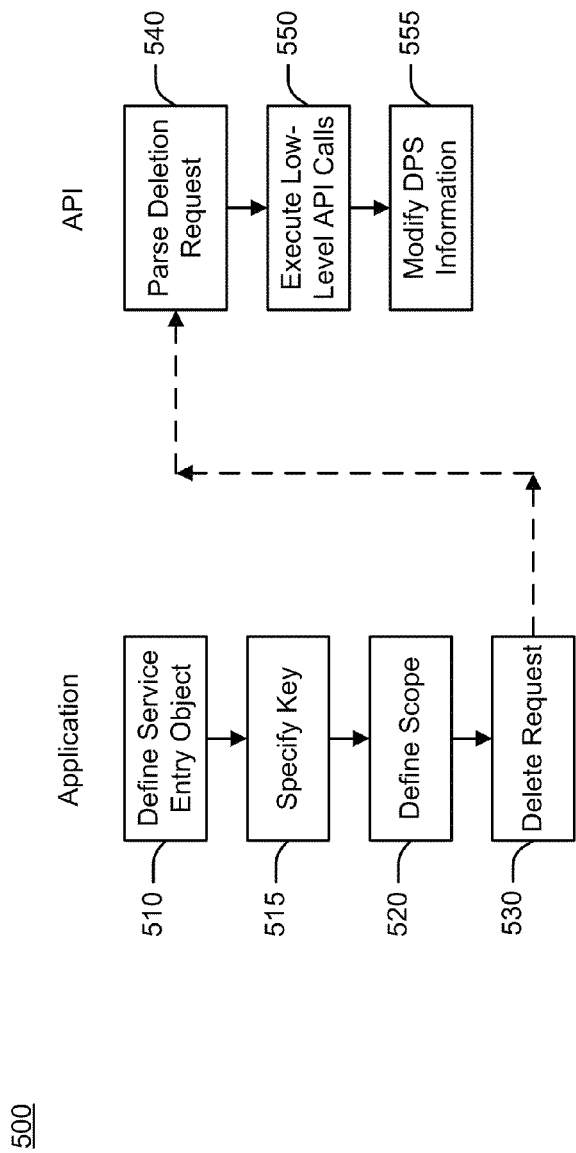
FIG. 5 is a flowchart illustrating operations for service deletion.

The service publication facilities of the service discovery API 214 can also be used to delete a published service. FIG. 5 is a flowchart illustrating operations for service deletion. At operation 510 an application defines a service entry object for the service publication. At operation 515 the application specifies the unique key for the service. At operation 520 the application defines a scope for the service deletion. At operation 530 the application generates a service deletion request.

The service discovery API 214 receives the deletion request and, at operation 540, parses the deletion request. At operation 550 the service discovery API 214 executes the low-level API calls to execute the service deletion request. At optional operation 555 the service publication is deleted from the discovery persistence service 212.

Figure 6:
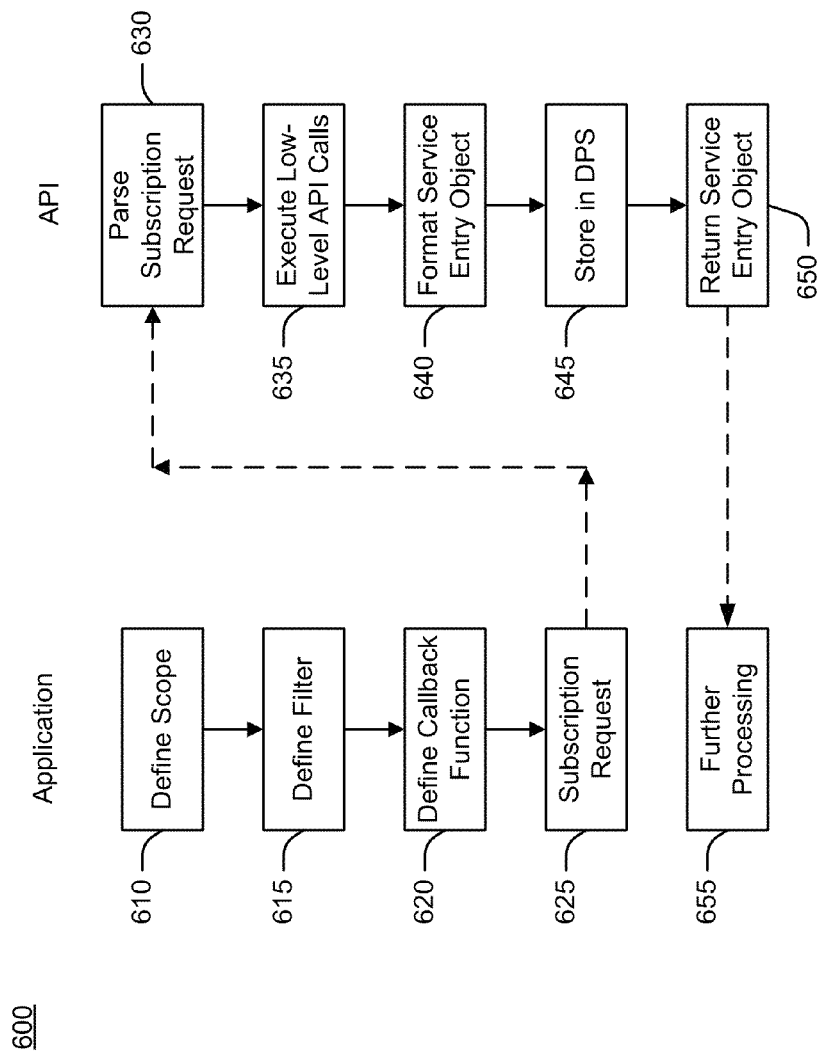
FIG. 6 is a flowchart illustrating operations for subscribing to service events.

The service discovery API 214 can also be used to allow applications to be notified of service events, such as the arrival or departure of a new service or device of a particular type. FIG. 6 is a flowchart illustrating operations 600 for subscribing to service events. At operation 610 an application defines a scope that specifies the particular low-level protocol to monitor. At operation 615 the application defines a filter that specifies the type of event. At operation 620 the application defines a callback function that will receive ServiceEntry details as matching events occur. At operation 625 an application generates a subscription request, which is forwarded to the service discovery API 214.

The service discovery request API 214 receives the subscription request and, at operation 630, parses the subscription request. At operation 635 the service discovery request executes the low-level protocol calls required to implement the subscription service. When a service event occurs the low-level protocol will provide the service discovery API with a notification of the event. At operation 640 the event notification is formatted into a service entry object. At optional operation 645 the service entry object may be stored in the discovery persistence service 212, and at operation 650 the service entry object is returned to the application using the previously specified callback function. At operation 655 the application performs further processing on the service entry object. The particular details of the further processing performed by the application are not important.

The system's components and operations are discussed in greater detail below.

API Classes
Filters

A Filter is a set of rules by which a service description can be evaluated, resulting in true (i.e., service description matches the filter) or false (i.e., service description doesn't match the filter). A filter can be expressed either as a simple filter, which specifies particular properties, or as a rich filter, which uses more expressive grammar. Whether expressed as a simple filter or a rich filter, queries can be specified and executed over more than one protocol without modification, subject to the capabilities of the underlying protocols. The service discovery request API 214 manages the re-expression of the higher level query into the correct format for the underlying low-level protocol. For example, the service discovery request API 214 can receive a query for a particular service type and express and evaluate it using LDAP for Active Directory and using the UDDI protocol for a UDDI Web service registry. An application developer is not required to work directly with the individual protocols.

In an exemplary implementation, the service discovery request API 214 requires discovery modules to support a simple filter, providing exact match semantics for provided criteria, and a rich filter containing a query expressed in the OPath grammar. It will be appreciated that each may also support additional "native" filter types. Different discovery modules may have protocol-specific native filter types, e.g., UPnP may use XPath filters, Active Directory may natively use LDAP filters, and UDDI may natively use a UDDI filter.

The base level of OPath filter functionality across the modules further insulates applications from underlying discovery protocols. The filter class exposes additional methods to parse and interpret the filter in a way that is shared across the modules.

A simple filter provides for expression of queries by specifying a service type, services interfaces, and/or properties. Any combination of these settings may be provided in a search query, and services will be included in the resulting service entry collection only if all of the criteria exactly match.

The service type may be implemented as a string that specifies the type that must match the service instances. A common set of service types are predefined in the service discovery request API 214. This set may be extended as key entities within protocols and stores are identified. For example, for printers in Active Directory, this would specify: filter.ServiceType=CommonServiceTypes.Printer.

The service interfaces may be implemented as a string collection that specifies identifiers for interfaces that services must match. As an example, for web services in UDDI, the following tModel identifiers could be specified: filter.ServiceInterfaces.Add("uuid:ac104dcc-d623-452f-88a7-f8acd94d9b2b"); filter.ServiceInterfaces.Add("uuid:4d2ac1ca-e234-142f-e217-4d9b2f8acd9b")

Properties may be implemented in a property dictionary that specifies service characteristics that services must match. As an example, for printers in Active Directory, the following properties could be specified: filter.Properties.Add ("printcolor", "TRUE"); filter.Properties.Add ("pagesperminute", "50")

A rich filter provides a mechanism for expressing significantly richer query semantics using, e.g., the OPath grammar, by setting a Query string property. As an example, for web services in UDDI, the Query string would specify the required name and a required supported interface: filter.Query="WebService[name='Fabrikam' and ServiceInterface='uuid:ac104dcc-d623-452f-88a7-f8acd94d9b2b']"

As a more expressive example to find printers in Active Directory capable of printing more than 25 pages per minute where A4 paper is not available: filter.Query="Printer[printPagesPerMinute>20+5 and not(printmediaReady='A4')]".

Since the capabilities of the underlying protocols and stores are far from identical, ranging from the basic NetBT to the rich Active Directory query semantics, the ability to use the more expressive constructs of OPath will depend upon the scope (protocol) selected.

Scopes

A scope identifies a query domain that can be searched, usually coarse and by network location or administrative boundary. Discovery queries are directed to one or more scopes, and the query result includes a subset of the services within those scopes, i.e., the query result is the subset of all services within the scope that match the given filter. Exemplary scopes include workgroup, localmachine, and domain.

The service discovery API 214 accommodates concrete scopes and abstract scopes. A concrete scope specifies a query domain in three pieces. A Protocol identifier that identifies a specific protocol, e.g., mapping to a single discovery module such as ConcreteScope.NetBtProtocol. or ConcreteScope.ADProtocol, an Address (optional) identifier that specifies a server to which to direct operations on this scope such as "http://intra-uddi/uddi/inquire.asmx" for an intranet UDDI server, and a path identifier (optional) that identifies a partition of the module's namespace, such as an LDAP search base which could be set to "CN=joe-dev,CN=Computers, DC=corp,DC=fabrikam,DC=com", or a UPnPv2 scope name.

The service discovery request API 214 passes concrete scopes to modules. The service discovery request API 214 does not preclude modules from performing additional indirection on concrete scopes such as, e.g., transmitting the concrete scope over the wire to a second machine and passing the concrete scope to a corresponding API on that second machine.

An abstract scope is a moniker for one or more concrete scopes and possibly further abstract scopes. Abstract scopes provide a mechanism for targeting a query across a logical predefined or configured concrete scope collection. This provides an additional abstraction that allows the developer to target, for example, an "enterprise" scope, without requiring explicit protocol, address, and connection details for particular directory servers.

The mapping of abstract scopes to concrete scopes is machine-wide and configurable. For example, an abstract scope AbstractScope.Enterprise might map to include both of the concrete scopes in Table 1.

Figure 7:
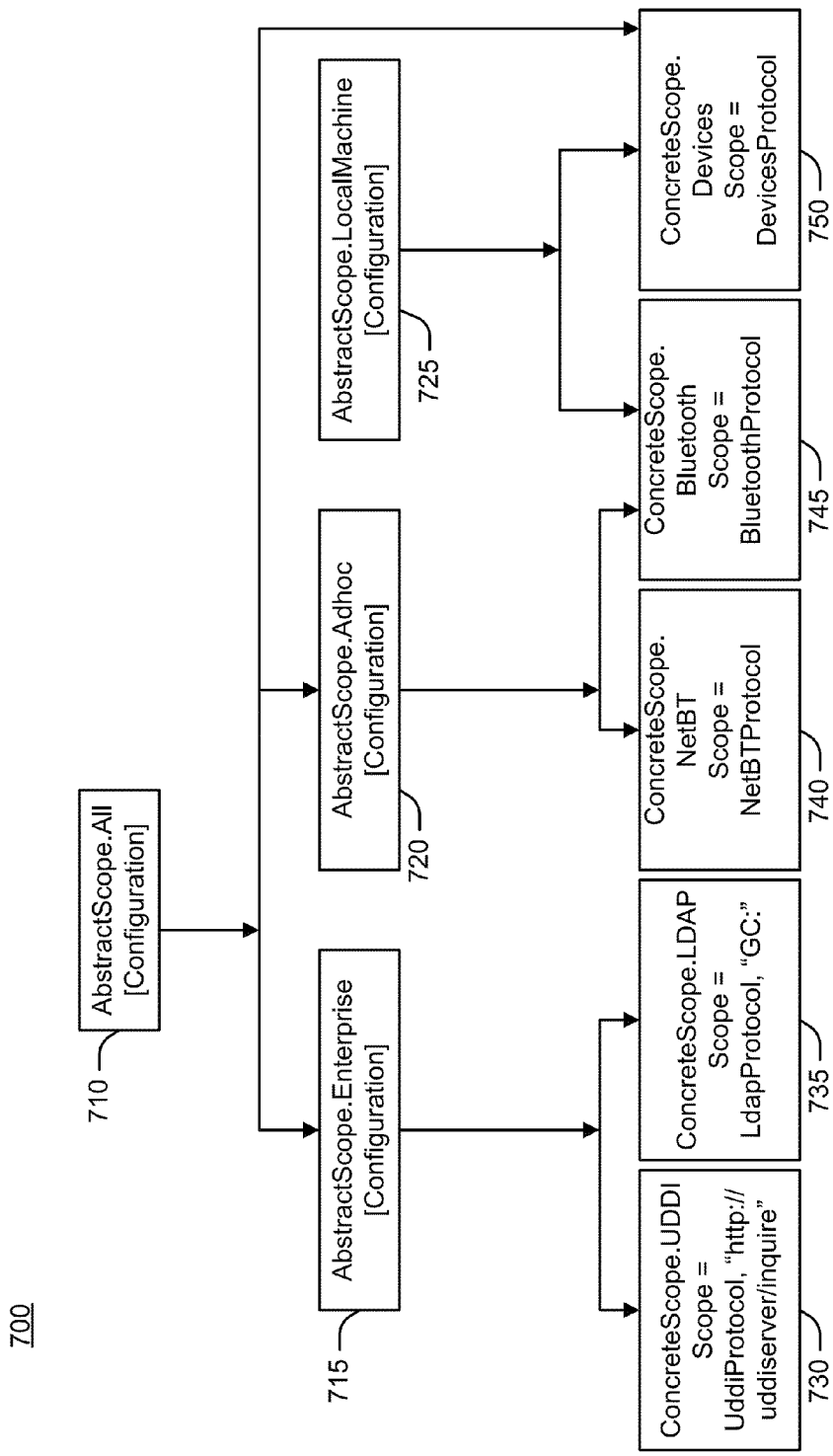
FIG. 7 is a block diagram illustrating the relationship between concrete scopes and abstract scopes

TABLE 1 protocol = ConcreteScope.ADProtocol
address = "ldap://dev.corp.fabrikam.com"
path = null
protocol = ConcreteScope.UddiProtocol
address = "http://uddi.fabrikam.com/inquire.asmx"
path = null FIG. 7 is a block diagram illustrating an exemplary relationship between concrete scopes and abstract scopes. Concrete scopes 730-750 provide the specification of the domain across which queries will be evaluated. Concrete scopes 730-750 comprise protocol identification details and, as required, specifics of a store or server to use, with the potential for further scoping within that store or server. Within the service discover API 214, these are specified in the Protocol, Address and Path properties respectively.

Abstract scopes 710-725 provide a higher level hierarchical abstraction over and above concrete scopes. Abstract scopes are configured to include the concrete or abstract scopes that make them up. This scope mapping will be available to system administrators, who can be able to configure exactly how, for example, the AbstractScope.EnterpriseScope should be resolved.

Both concrete and abstract scopes can be used by a user of the service discovery API 214. In the case where an abstract scope is provided, the service discovery API 214 will resolve this down, through the hierarchy, to a number of concrete scopes.

Abstract scopes allow developers of application programs 210 to work at a relatively high level and include scope identifying terms such as "AbstractScope.Enterprise" in code. In this way, for example, the developer is not required to hardcode the specifics of a particular UDDI server into his code. This abstraction provides for greater reuse and portability of code. The same piece of code can be used in a variety of enterprise environments without change or recompilation. Only the abstract scope configuration would change between environments.

There may be multiple hierarchies of abstract to concrete scope mappings. In FIG. 7 AbstractScope.LocalMachine does not map up into AbstractScope.All even though all of its constituents are included.

In an exemplary implementation the scope map configuration may be manipulated through group policy by a system administrator to control the use of the service discover API 214 in the enterprise. By way of example, an administrator could define one or more abstract scopes available in the enterprise computing environment, or in a portion of the enterprise computing environment. This permits a system administrator to regulate the discovery and use of resources by applications.

ServiceEntry Results

An application developer can select appropriate Scope and Filter expression, which may then be set as properties on a service finder object. The application can then use the FindOne or FindAll methods to execute a discovery request. The FindAll method returns all services matching the supplied criteria, whereas the FindOne method returns a single matching service. The methods may be executed using a synchronous or an asynchronous calling pattern.

Assuming that there are services that match the provided filter within the specified scope, the FindOne or FindAll methods will return one, or a collection of, service entry objects. The service entry object is an abstraction over the various representations of services that the underlying protocols can provide. Each service entry object corresponds to a single instance of a service and as such, offers descriptive and identifying properties including those set forth in Table 2.

TABLE 2

| Property | Comments |
| --- | --- |
| Name | Identifies Service Instance |
| Description | Description of Service Instance |
| Endpoints | The set of endpoints at which the service instance can be accessed |
| Key | The identifying key for the service instance |
| Scopes | The scopes that an entity was discovered from or is to be published into |
| Credentials | Specifies the credentials that will be used when publishing this service. |
| Provider | References the "provider" (container) of the service, if any |
| Expiration | Time at which the service entry will expire, based on a time-to-live |

A public void Save( ) function is provided to create or update the service entry representation in the scopes specified in the scopes collection.

A public void Delete( )method removes this ServiceEntry object from the scopes specified in the Scopes property. An exception will be thrown if the service is not already published.

Pseudo-Code

FIGS. 8-19 illustrate pseudo-code for performing various service discovery, publication, and subscription functions.

FIG. 8 is pseudo-code illustrating how to use the C# programming language to locate color printers that print 50 pages per minute using a SimpleFilter object on the Active Directory protocol.

FIG. 9 is pseudo-code illustrating how to use the C# programming language to locate Web services that implement the uddi-org:inquiry_v2 interface and are named Fabrikam using the RichFilter object over the UDDI protocol.

FIG. 10 is pseudo-code illustrating the use of the C# programming language to find services supporting a specific tModel interface using a SimpleFilter object and the UDDI protocol.

FIG. 11 is pseudo-code illustrating the use of Visual Basic.NET to find services supporting a specific tModel interface using a SimpleFilter object and the UDDI protocol.

FIG. 12 is pseudo-code illustrating the use of the C# programming language to locate a printer with a name like Office Printer using the RichFilter with Active Directory.

FIG. 13 is pseudo-code illustrating the use of Visual Basic.NET to locate a printer with a name like Office Printer using the RichFilter with Active Directory.

FIG. 14 is pseudo-code illustrating the use of the C# programming language to publish a service of a specific type, identified by a specific unique identifier, using the SSDP protocol.

FIG. 15 is pseudo-code illustrating the use of Visual Basic.NET to publish a service of a specific type, identified by a specific unique identifier, using the SSDP protocol FIG. 16 is pseudo-code illustrating the use of the C# programming language to delete a service from the SSDP protocol.

FIG. 17 is pseudo-code illustrating the use of Visual Basic.NET to delete a service from the SSDP protocol.

FIG. 18 is pseudo-code illustrating the use of the C# programming language to use a SimpleFilter to register for events of a specific type that use the SSDP protocol. The registered callback function will be invoked for every event that matches the filter and the corresponding ServiceEntry object will be provided to that handler.

FIG. 19 is pseudo-code illustrating the use of Visual Basic.NET to use a SimpleFilter to register for events of a specific type that use the SSDP protocol.

Exemplary OPath Syntax

Table 3 provides exemplary OPath syntax for various discovery functions.

TABLE 3

| OPath | Refers to |
| --- | --- |
| Printer | Find all printers and print queues. |
| Printer[ name = 'Upstairs Printer' ] | Find all printers where the name is Upstairs Printer. |
| Printer[ printPagesPerMinute > 20 + 5 and not( printmediaReady = 'A4' )] | Find all printers capable of printing more than 25 pages per minute and A4 paper is not available. |
| Printer[ Properties.name like 'Pri' and ( printPagesPerMinute > 10 or printMediaReady = 'letter' )] | Find all printers where the name begins with Pri and either the pages per minute is greater than 10 or letter paper is available. |
| Printer[ supportsColor = true && ( printerName like 'Home' or name like 'Work' ) ] | Find all printers which support color and the name begins with Home or Work. |
| Service[ ServiceInterface=ServiceConnectionPoint] | Find all services which are ServiceConnectionPoint objects. |

TABLE 3-continued

| OPath | Refers to |
| --- | --- |
| Service[ (serviceType = 'Printer' or serviceType= 'Computer' ) and name like 'Work' ] | Find all services, either printers or computers, that have a name like Work. |
| Computer[ operatingSystemVersion like '%3790%' ] | Find all computers that are running an operating system whose version number contains 3790. |
| Computer[ operatingSystem='Windows Server 2003' ] | Find all computers that are running a particular operating system. The operatingSystem attribute is not included in the global catalog. |

Table 4 contains examples of OPath syntax that can be used on the UDDI protocol.

TABLE 4

| OPath | Refers to |
| --- | --- |
| WebService[ name = 'Fabrikam'] | Find all Web services where the name is Fabrikam. |
| WebService[ name = 'UDDI%' && ServiceInterface = 'uuid:ac104dcc-d623-452f-88a7-f8acd94d9b2b' ] | Find all Web services where the name starts with UDDI and that supports the identified interface (i.e. the tModel uddi-org:inquiry_v2). |

Table 5 contains examples of OPath syntax that can be used on the NetBT protocol.

TABLE 5

| OPath | Refers to |
| --- | --- |
| Workstation | Find all workstations. |
| Service[ ServiceType = 'PrintQueueServer' ] | Find all services of type PrintQueueServer. |
| Computer[ serviceInterface = 'DomainController' and ServiceInterface = 'TerminalServer' ] | Find all domain controller computers running as a terminal server. |

Discovery Persistence Service

As described briefly above, the discovery persistence service 212 manages a persistent data store for service information. Periodically, or at predetermined events, such as startup, the discovery persistence service registers to receive ad-hoc device/service announcements. As an example, when a new UPnP device is introduced it will generate a device announcement that will be handled by the UPnP protocol module. This module will then surface details of that event (the device and its services) to the discovery persistence service through the service discovery API 214.

Using its persistent data store, the discovery persistence service then determines whether this is a new device/service or a returning device/service. If it is a new device/service, the details of the device and its services will be registered in the persistent data store. When another consumer of the service discovery API 214 then attempts to find services, the service discovery API 214 will be able to return services for ad-hoc devices/services, even if the devices are not currently available. For the above example, in the case where the device/service is currently available, depending upon the scope specified, both the UPnP protocol module and the persistent data store module may return results for the device. In addition to UPnP, this functionality applies to other ad-hoc discovery mechanisms.

Thus, the discovery persistence service 212, the service discovery API 214, and the local database store 240 provide a layer of abstraction over the various low-level protocols used for device and service discovery. This additional layer of abstraction establishes a common and improved search semantic that application developers may use in developing applications.

In addition, the discovery persistence service 212, the service discovery API 214, and the local database store 240 provide a consolidated discovery model for services and devices on a local machine, a home network(s), an enterprise network(s), and the internet. Thus, application developers can discover services in a wide variety of locations by writing to a single, consistent API.

CONCLUSION

Although the described arrangements have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. A system for managing services available in a computing environment, comprising:
    a processor;
    a memory;
    a first application programming interface, stored in the memory and executed, at least in part, by the processor, the first application programming interface configured to accept from an application, service queries expressed in a high-level grammar, the first application programming interface configured to receive the service queries, process the service queries, and launch at least one corresponding service query as a protocol-specific expression;
    a discovery persistence service comprising a simple filter and a rich filter communicatively connected to the first application programming interface, the discovery persistence service configured to receive service information from the first application programming interface and store the service information in a data store.

2. The system of claim 1, wherein the first application programming interface provides an interface to at least one directory-based protocol and at least one ad-hoc protocol.

3. The system of claim 1, wherein the simple filter provides for expression of the service queries by service type, service interface and/or service characteristics.

4. The system of claim 1, wherein the rich filter provides for expression of the service queries using query semantics.

5. The system of claim 1, wherein the first application programming interface discovers services available on a local computing device.

6. The system of claim 1, wherein the first application programming interface discovers services available on a remote computing device.

7. The system of claim 1, wherein the first application programming interface implements a scope map, and wherein the scope map is configurable by a system administrator.

8. The system of claim 1, wherein the high-level grammar comprises a natural query language used for expressing discovery queries.

9. The system of claim 8, wherein the high-level grammar is implemented according to OPath.

* * * * *